(12) United States Patent
Keil et al.

(10) Patent No.: US 6,233,377 B1
(45) Date of Patent: May 15, 2001

(54) DIGITAL OPTICAL SWITCH

(75) Inventors: Norbert Keil; Huihai Yao; Crispin Zawadzki, all of Berlin (DE)

(73) Assignee: Heinrich-Hertz-Institut für Nachrichtentechnik Berlin GmbH, Berlin (DE)

( * ) Notice: Subject to any disclaimer, the term of this patent is extended or adjusted under 35 U.S.C. 154(b) by 0 days.

(21) Appl. No.: 09/194,985
(22) PCT Filed: May 30, 1997
(86) PCT No.: PCT/DE97/01129
§ 371 Date: Dec. 7, 1998
§ 102(e) Date: Dec. 7, 1998
(87) PCT Pub. No.: WO97/46909
PCT Pub. Date: Dec. 11, 1997

(30) Foreign Application Priority Data

Jun. 5, 1996 (DE) .............................................. 197 23 888

(51) Int. Cl.[7] .................................................... G02B 6/26
(52) U.S. Cl. ................................................. 385/16; 385/40
(58) Field of Search .............................. 385/2, 8, 16, 20, 385/40

(56) References Cited

U.S. PATENT DOCUMENTS 5,303,315 * 4/1994 Granestrand ............................ 385/16
6,094,516 * 7/2000 Nolting et al. .......................... 385/40

* cited by examiner

Primary Examiner—Frank G. Font
Assistant Examiner—Roy M. Punnoose
(74) Attorney, Agent, or Firm—Karl Hormann

(57) ABSTRACT

A digital optical switch with two input terminals and two output terminals to satisfy the extensive uses of optical switches. The conditions for adiabatic mode evolution can be flexibly adjusted depending on the planned use for said switch, the technological production thereof still being simple. In the digital optical switch according to the invention, the first incoming waveguide, with regard to the second incoming waveguide in the input section and the third outgoing waveguide with regard to the fourth outgoing waveguide in the output section are symmetrical with each other in cross-section, index of refraction and arrangement in relation to the direction in which the light spreads. Structural electrodes have a tapering effect on the wave guides and are adjusted thereto, and an electrode arranged in the output section is electrically driven.

15 Claims, 4 Drawing Sheets

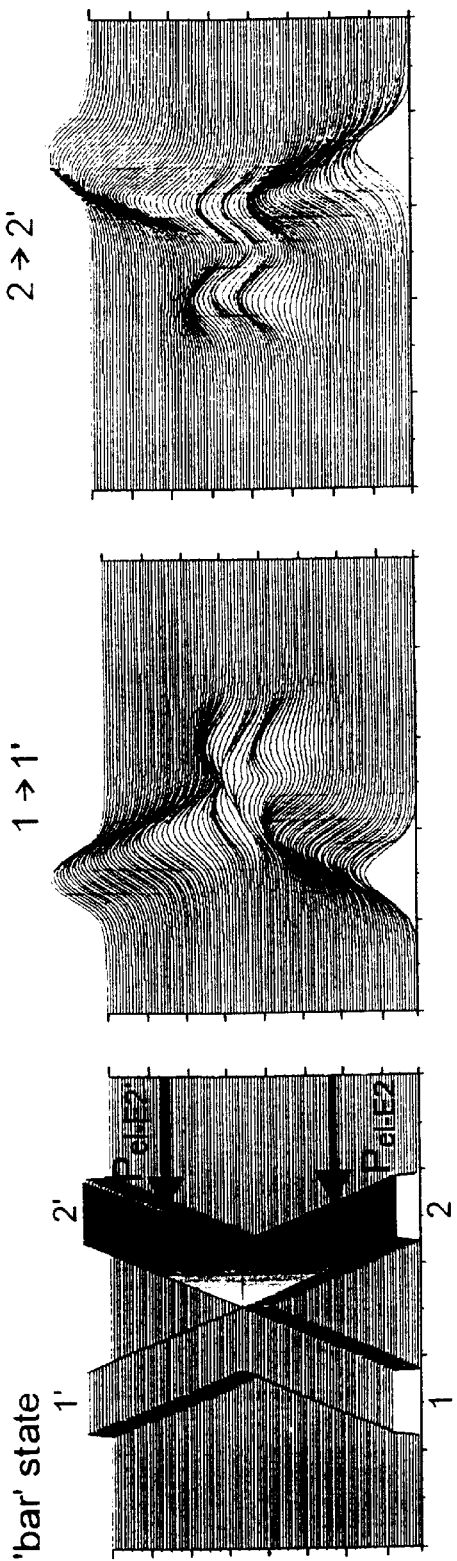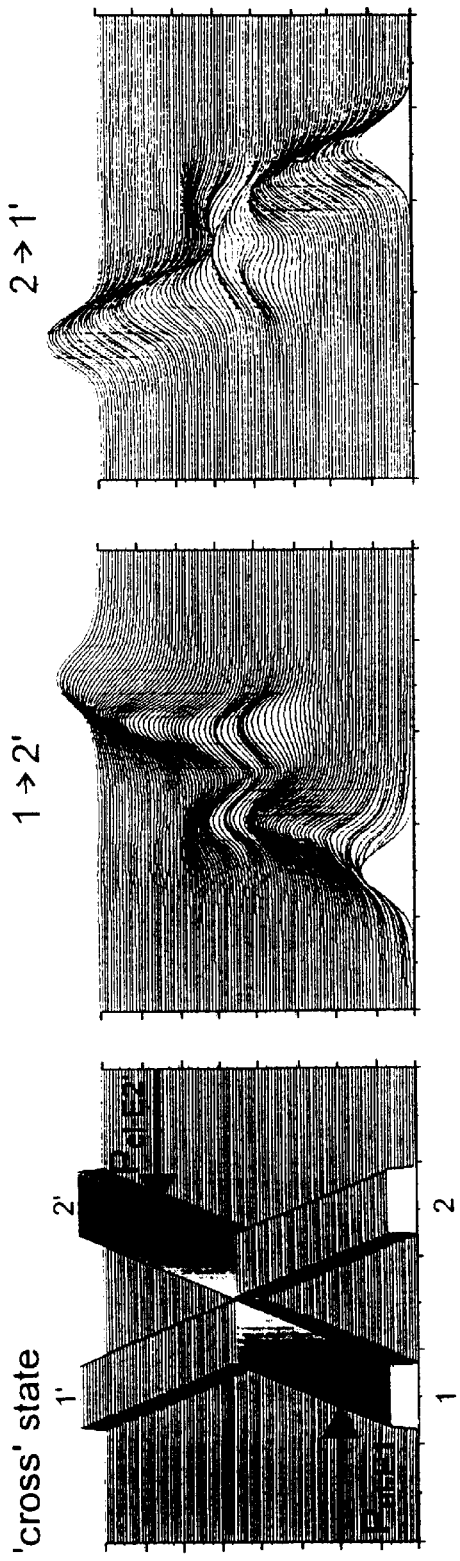

DIGITAL OPTICAL SWITCH

BACKGROUND OF THE INVENTION

1. Field of the Invention

The invention relates to a digital optical switch including a first section, called input section, having a first input waveguide and a second input waveguide, these waveguides converging toward each other to, and engaging each other at, the point of their coupling range, and a second section, called output section, having a third output waveguide and a fourth output waveguide, these output waveguides diverging from each other from this point to a point outside of their coupling range, the waveguides of the second section connecting to those of the first section, and means for controlledly influencing the state of light propagation in accordance with the adiabatic mode evolution.

Optical switches are attractive components for the connection of broad-banded optical signals in optically transparent networks, for the protection of control circuitry for by-passing a defective system or cable, and for spatial switches in transparent optical network nodes. Switching of a TV cable in a local area network (LAN), of broad-band optical ports of a computer or of optical signals in sensors and automobiles constitute further applications in the fields of telecommunications, micro system technology and automotive vehicles. These different applications require distinct switching parameters, such as low cross-talk and low switching power, independence of polarization and wavelength immunity.

2. Prior Art

The state of the art from which the invention is proceeding, may be taken from U.S. Pat. No. 4,775,207 or Appl. Phys. Lett. 51 (16), Oct. 19, 1987, pp. 1230–1232, and from European Patent 0 457 406.

The first-mentioned publications relate to a digital optical switch provided with waveguides based upon $LiNbO_3$ and disposed in an X-shaped arrangement, the width of the two converging waveguides at their input section being different. The output waveguides, commencing at their point of engagement, are embraced by electrodes. The two input waveguides in the input section and, in the output section, the two output waveguides extending from the point of engagement, are disposed relative to each other at an angle $\Theta$ where $\Theta<<\Delta\beta/\gamma$, $\Delta\beta$ being the average difference of the propagation constants of the two symmetric modes and $\gamma$ being the transverse wave constant in the vicinity of the waveguides. In this four-gated digital electro-optical switch, the switching operation is based upon the adiabatic mode evolution with reference to asymmetric width of the input waveguides. In this manner only a predetermined mode can controlledly propagate in the waveguides at an appropriate switching of the output waveguides.

In European Patent 0,457,406, there is described a digital optical switch in which the input waveguides in the input section are of asymmetric shape and in which the output waveguides in the output section are asymmetric or symmetric relative to each other and may be electrically switched, the asymmetry in the shape of the waveguides in the input and output sections being realized by a straight and a curved waveguide converging toward or diverging from each other. The purpose of the curved shape of the waveguides converging toward each other in the input section and diverging from each other in the output section is to reduce the length of the component relative to the previously described digital optical switch (DOS).

In the arrangements of 2×2 DOS's thus far described by the prior art the asymmetry required for the principle of adiabatic mode evolution has been realized, at least in part, in the input and/or output section thereof during the its fabrication. Adiabatic light propagation is possible only at small changes of the waveguide parameters so that the optical energy impinging upon the switch in a given basic mode, is maintained in this mode, i.e., no mode transformation occurs. If, therefore, optical energy of a low mode order impinges upon the switch, the light will be conducted through the output waveguide of the higher refractive index, resulting in a higher extinction ratio if the optical energy propagates essentially adiabatically in the switch.

Furthermore, digital optical switches are known which are constituted by 1×2-Y-branches. Thus, there was a report about a digital thermo-optical 1×2 switch made of polymer (see: Proc. 21st Eur. Conf. on Opt. Comm., pp 1063–1065) in which the waveguides are buried, the output branches include an angle of 0.12°, and heating electrodes are arranged completely to cover both branches. Upon heating an output branch light will be conducted into the unheated branch. An extinction coefficient better than 20 dB at a switching power between 130 mW and 230 mW was measured in the unheated branch; at about 180 mW the extinction coefficient reached a value of 27 dB.

In another report from ECOC'95—Brussels a 1×8 DOS is described for the first time which is constructed of three cascades of 1×2 switches (see: Proc. 21st Eur. Conf. on Opt. Comm., pp. 1059–1062. This solution, too, makes use of the thermo-optic effect in polymeric waveguides, which at a low switching power is capable of effecting a large change of the refractive index and, hence, a controlled conduction of the mode.

OBJECTS OF THE INVENTION

It is the task of the invention to provide a digital optical switch having two inputs and two outputs in which the conditions for an adiabatic mode evolution are flexibly adjustable, depending on its application and which may be fabricated by simple technology.

SUMMARY OF THE INVENTION

In accordance with the invention the task is accomplished by a digital optical switch of the kind referred to above in which the first input waveguide and the second waveguide in the input section and the third output waveguide and the fourth output waveguide in the output section are respectively arranged identically to each other as regards their cross-section, refractive index and symmetrical in their arrangement relative to the direction of propagation, and in which structured electrodes of spatially variable width are arranged adjacent to the waveguides and in which an electrode arranged in the input section and an electrode arranged in the output section are adapted to be electrically energized.

Because of the arrangement of two identical waveguides each in the input and output sections and because of the electrodes arranged adjacent to the waveguides and exerting a tapering effect thereupon, the solution in accordance with the invention, for the realization of an adiabatic mode evolution, makes possible a separate adjustability of the parameters in each waveguide branch. In this manner, an asymmetric waveguide transition may be realized without any need for preadjustment by way of the waveguide geometry in a section of the DOS during its fabrication, since both sections, the input as well as the output section, in accordance with the invention are structured as switching sections. The DOS in accordance with the invention which is based upon adiabatic mode evolution displays a stepped switching behavior which results in a defined switching state being maintained as long as an applied switching voltage or a current is above a certain threshold. Because of the flexible adjustability of its operating mode by the electrodes its provides for large fabrication tolerances and reduced the need for a precise setting of the switching voltage or of a precise current control. Moreover, such a DOS is immune from wavelengths.

Embodiments in accordance with the invention provide for the first input waveguide and the second input waveguide converging toward each other in the input section in straight lines at an angle $\Theta$, where $\Theta<<\Delta\beta/\gamma$, wherein $\Delta\beta$ connotes the average difference between the propagation constants of the two symmetrical modes and $\gamma$ connotes the transverse wave constant in the vicinity of the waveguides vicinity, and the third output waveguide and the fourth output waveguide diverging from each other in straight lines at the same angle $\Theta$ in the output section or the first input waveguide and the second input waveguide converging toward each other arcuately in the input section and the third output waveguide and the fourth output waveguide diverging from each other arcuately in the output section; in a special arrangement of the embodiments thus far mentioned the input waveguides in the input section being identical as regards cross-section and refractive index and symmetric in their arrangement relative to the output waveguides in the output section, or the first input waveguide and the second input waveguide converging toward each other in straight lines at an angle $\Theta$, where $\Theta<<\Delta\beta/\gamma$ and the third output waveguide and the fourth waveguide diverging from each other arcuately in the output section, or the first input waveguide and the second input waveguide converging toward each other arcuately in the input section and the third output waveguide and the fourth output waveguide diverging from each other in straight lines at angle $\Theta$.

Other embodiments provide for the electrodes arranged adjacent to the waveguides to cover the waveguides in a tapered manner or to be structured in a taper-like manner and to be positioned in the same layer as the waveguides.

In these embodiments the solution in accordance with the invention comply with the waveguide materials mentioned in a further embodiment to be selected from the group: III-V-semiconductors, LiNbO$_3$, glass, Si—Ge-hybrid crystals, SiO$_2$, polymers, in order to realize the desired effect in any variation, i.e. the controlled adjustability of the difference in the speed of propagation of light in both waveguides of the input section based upon the thermo-optical or electro-optical effect as a function of the waveguide material. The ability to select from a wide spectrum of materials for fabricating the digital optical switch in accordance with the invention leads to an even wider field of application.

Further embodiments of the invention relate to control variants of the electrodes. Thus, the electrode arranged adjacent to an input waveguide in the input section and the electrode arranged in the output section adjacent to the output waveguide positioned mirror symmetrically to this input waveguide or adjacent to the output waveguides positioned point-symmetrically to this input waveguide are adapted to be electrically energized.

These embodiments of the invention which relate to the symmetrical arrangement of the input waveguides in the input section and of the output waveguides in the output section as well as to the controlled adjustment of an asymmetry in the light propagation between the waveguides in the input or output sections by energization of the electrodes and thus to the change in light propagation in the waveguides arranged adjacent to the energized electrodes, ensure a great many variations in which the DOS in accordance with the invention may be realized.

The area in which the electrode exerts a tapering effect upon the waveguide ensures the adiabatic waveguide coupling in the input and output sections. In connection with a first input waveguide and a second waveguide which approach and engage each other in straight lines at an angle $\Theta$ where $\Theta<<\Delta\beta/\gamma$ in an input section and a third output waveguide and a fourth output waveguide which diverge from each other from the point of engagement in straight lines at the same angle $\Theta$ in the output section, the condition for the adiabatic mode evolution may be adjusted by energizing an electrode in the input section such that a controlled difference $\Delta\beta$ in the speed of propagation of the light is generated in the two input waveguides of the input section. If the angle $\Theta$ satisfies the conditions for an adiabatic mode evolution and if the angle is sufficiently small, either the symmetrical mode or the asymmetrical mode, depending on whether the corresponding input waveguide is heated or unheated, will be generated in the central region in which the point is located at which the waveguides in the input section meet and from which the output waveguides in the output section diverge. Accordingly, the symmetrical mode may be conducted from the central region to the desired output waveguide by precisely setting the heating power of the electrodes arranged adjacent to the output waveguides. The symmetrical mode will always propagate in the unheated waveguide and at a sufficient heating power the asymmetric mode will propagate in the heated waveguide. Hence, all waveguides in the input and output sections realized in accordance with the invention are monomodal. The condition for the adiabatic mode evolution may be set analogously, if the waveguide in at least one of the sections, i.e. the input or output section, of the DOS in accordance with the invention is formed arcuately.

In a matrix consisting of a plurality of prior art digital optical switches arranged in a cascade, taper regions are required because of the differing dimensions of the input waveguide branches. These taper regions would increase the structural length of the matrix in an undesirable manner and would not permit an optimum input attenuation. These disadvantages do not occur in the embodiment of the invention as it relates to the mirror and point symmetrical configuration of the input waveguides in the input section relative to the output waveguides in the output section and its realization of a bidirectionally operable DOS, since the field distribution need only be adjusted to a cross-section which for all waveguides is the same. The DOS in accordance with the invention is, therefore, ideally suited for use as a matrix building block. Furthermore, the DOS in accordance with the invention represents a very compact arrangement compared to the 1×2-Y-switch mentioned in the prior art which as a matrix made up of four such switches would be capable of functioning in the manner of the DOS in accordance with the invention.

In a preferred embodiment, the digital optical switch in accordance with the invention is fabricated on a polymeric basis. The angle $\Theta$ enclosed by the two linearly converging or diverging waveguides is $\leq 0.1°$. The electrodes are arranged in a buffer layer over the waveguides and cover them in a tapering manner. In this preferred embodiment, the refractive index of a given waveguide may be adjusted by $\Delta n>0.0015$, by energization of the electrodes. Because of well established fabrication technology the use of polymeric waveguides makes many different structures possible. Moreover, polymers have a large thermo-optic coefficient, i.e., changes in temperature result in large changes of the refractive index, coupled with low conductivity. It is possible by means of polymer technology to integrate, by way of hybrid technology, a plurality of optical components on a single substrate.

BRIEF DESCRIPTION OF THE DRAWINGS

Embodiments of the invention will hereafter be described in greater detail with reference to the drawings, in which:

FIG. 3 the simulated beam propagation method (BPM) for the bar state of the digital optical switch shown in FIG. 1;

FIG. 4 Depicts the simulated cross state of the digital optical switch shown in FIG. 1;

DETAILED DESCRIPTION OF PREFERRED EMBODIMENTS

Figure 1:
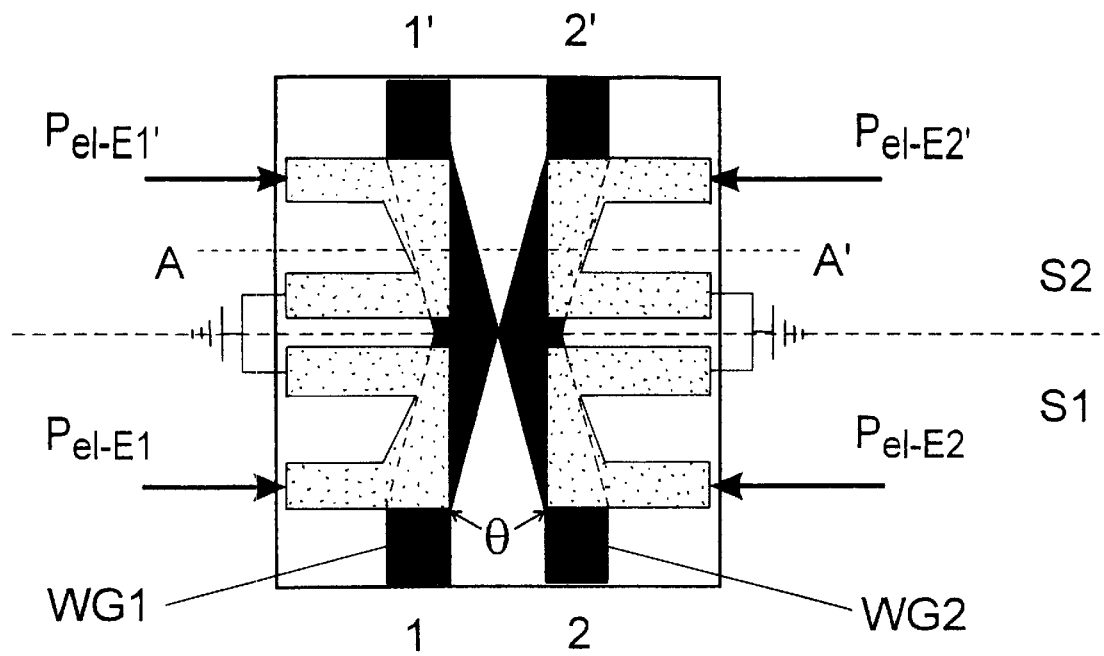
FIG. 1 is a schematic presentation in top elevation of a multi-layer structure of a digital optical switch on a polymeric basis.

The multi-layer structure of a polymer-based digital optical switch shown in FIG. 1 is provided in its input and output sections S1 and S2 with symmetrical waveguides of identical cross-section and refractive index. Two input waveguides WG1 and WG2 with corresponding input gates 1 and 2 are arranged at an angle $\Theta=0.08°$ in the input section S1. Waveguides WG1' and WG2' with corresponding output gates 1' and 2' diverging from each other at the same angle $\Theta$ are shown in the output section S2. The waveguides in the input section S1 are arranged symmetrically with respect to the waveguides in the output section S2. The waveguides were fabricated from PMMA on a 3" Si wafer by standard polymer waveguide technology. There cross-section measures 7 $\mu$m×7 $\mu$m. The input and output waveguides are spaced 250 $\mu$m from each other. The overall length of the digital optical switch is 25 mm. Each of the four waveguides WG1, WG2, WG1' and WG2' is taperingly superposed by an electrode E1, E2, E1' and E2'. The propagation properties of light in the digital optical switch in accordance with the invention are characterized by an adiabatic mode evolution. The conditions for the adiabatic mode evolution can be realized for each waveguide WG1, WG2, WG1' and WG2' by energizing the corresponding electrode E1, E2, E1' and E2'. As a result of the invention, a digital optical switch having two inputs and two outputs can finally be fabricated on a polymer basis.

Figure 2:
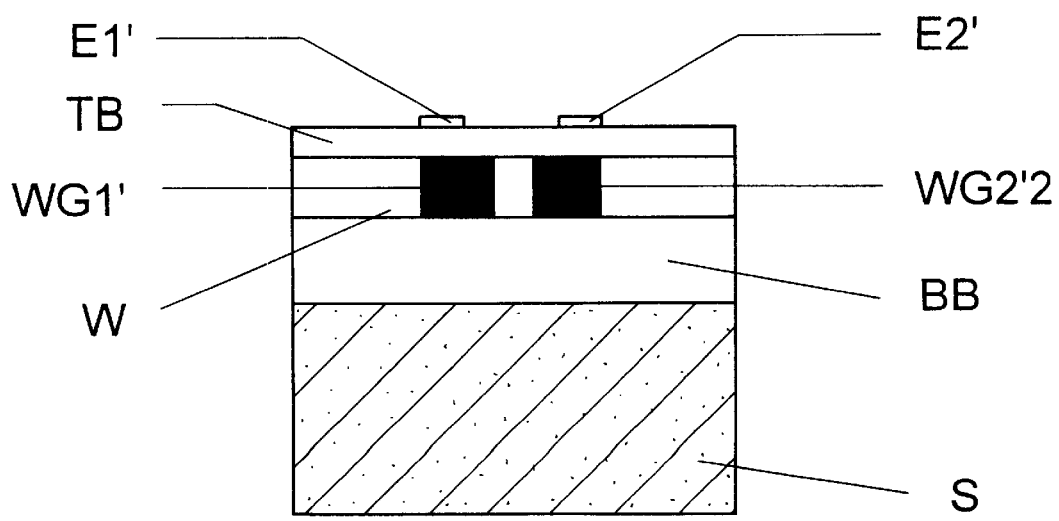
FIG. 2 is a section along line A—A' of the multi-layer structure shown in FIG. 1.

In FIG. 2, the 2×2 polymeric digital optical switch described supra in top elevation is depicted in cross-section. A SiO$_x$ buffer layer is arranged on a Si substrate which serves as a heat sink. For the reduction of losses and for protection against moisture, a 3 $\mu$m thick buffer layer TB made of Teflon® is arranged on the waveguide layer W in which the waveguides WG1, WG2, WG1' and WG2' are disposed. As a final layer, a corresponding heating electrode E1, E2, E1' and E2' is arranged in superposition over each waveguide WG1, WG2, WG1' and WG2' such that overlaps the waveguide in a tapering manner.

The function of the DOS in accordance with the invention which is based upon adiabatic mode evolution, may be described particularly well with reference to FIG. 3 and FIG. 4. the first partial image of which depicts the input and output sections S1, and S2 and the waveguides WG1, WG2, WG1' and WG2' arranged in an X-shaped configuration. It also shows which electrode is being heated. Th ensuing partial images depict the possible propagation of a lightwave in the individual waveguides WG1, WG2, WG1', and WG2' in their bar and cross states.

If as shown in FIG. 3, electrodes E2 and E2' are heated, i.e. if they are energized by a power of $P_{el-E2}$ and $P_{el-E2'}$, the digital optical switch will operate in its bar state. As the light conducted into the unheated waveguide WG1 reaches the central region, the symmetric mode -as shown in the second partial image- is conducted through waveguide WG1' which has a higher index of refraction compared to waveguide WG2'. If light is conducted into the heated waveguide WG2 the asymmetric mode will in the central region be conducted into the waveguide WG2' which has a lower index of refraction. Between the unheated waveguide WG1/WG1' and the heated waveguide WG2/WG2' the difference in refractive index was found to be $\Delta n=0.0025$.

If, as may be seen in the first partial image of FIG. 4, electrodes E1 and E2" are heated, i.e., energized at a power of $P_{el-E1}$ and $E_{el-E2'}$. the DOS in accordance with the invention will operate in its cross state. In this case, too, the same difference in refractive index as mention above, was detected. If light is conducted into heated waveguide WG1 the asymmetric mode is excited in the central region and the light will be conducted through the heated waveguide WG2' which has the lower index of refraction. If light is conducted through the unheated WG2 the symmetric mode is excited in the central region and light will be conducted through the waveguide WG1'. It was found that the adiabatic mode can be maintained in the waveguides in the input section as well as in the waveguides in the output section provided that at an angle of $\Theta \leq 0.1°$ between the waveguides in the input or output section the difference in refractive index is $\Delta n > 0.0015$.

In order to characterize the polymeric digital optical switch in accordance with the invention, the schematic structure and function of which were explained in FIGS. 1 and 2, and FIGS. 3 and 4, respectively, light from a laser diode at $\gamma=1.55$ $\mu$m was coupled into the input gate 1 and into the input gate 2, and the optical power $P_{opt}$ was measured at the output gates 1' and 2'. Since it was found that the TE and TM polarization values were polarization dependent by <±0.5 dB only, only the results for the TM polarization have been indicated.

Figure 5:
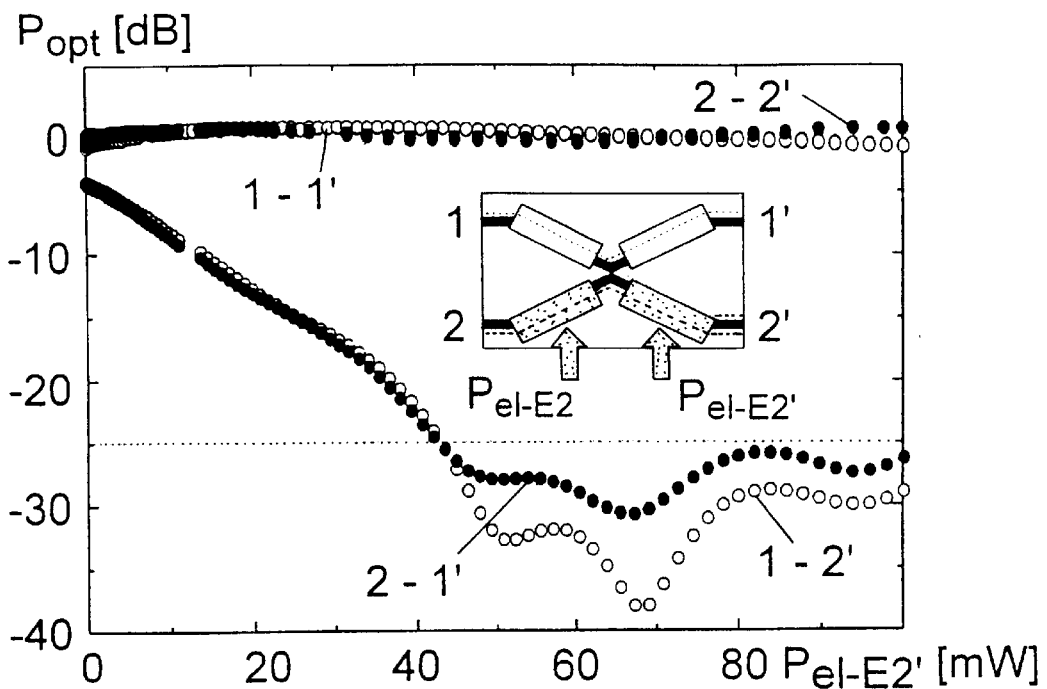
FIG. 5 is a measurement trace of the optical efficiency of the waveguides of the output section as a function of the electrical power for energizing the electrodes of a digital optical switch in accordance with FIG. 1, in its bar state.

FIG. 5 thus shows the measurement trace of the transfer characteristic at a wavelength of $\gamma=1.55$ $\mu$m as a function of the electrical power $P_{el-E2'}$, i.e., in this case it was electrode E2' which was heated. The electrode E2 was energized at a constant power $P_{el-E2}$, which in this case was 65 mW (the energization is depicted in the inserted image). This is necessary in order to realize the adiabatic mode evolution within waveguides WG1 and WG2 of the input section 1. In this configuration the switch operates in its bar state. The value measured for cross-talk was measured as <−25 dB at an electric switching power of $P_{el-E2'} \geq 45$ mW. It was found that this value does not change for switching powers of $P_{el-E2'}$, 100 mW.

Figure 6:
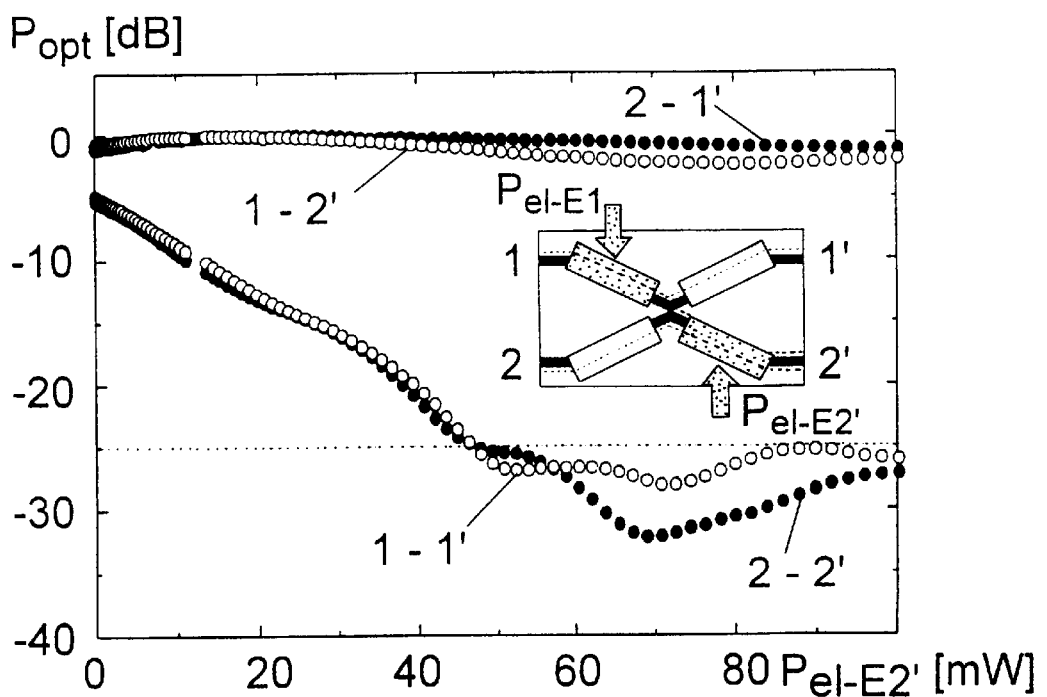
FIG. 6 is a measurement trace of the optical efficiency of the waveguides of the output section as a function of the electrical power for energizing the electrodes of a digital optical switch in accordance with FIG. 1, in its cross state.

The transfer characteristic for a polymeric digital optical switch in accordance with the invention as a function of electric power $P_{el-E2'}$ for the cross state is shown in FIG. 6. In the case, electrode E1 is energized by a constant electric power $P_{el-E1}$=45 mW in order again to satisfy the conditions of adiabatic mode evolution in waveguides WG1 and WG2 of the input section S1. If the variably adjustable switching power assumes values of $\geq 45$ mW, here, too, the measured cross-talk was <−25 dB. The insignificant deviation of the powers set as a constant in both described switching states must be assumed to be the result of insignificant manufacturing differences in the electrodes and waveguides. This does not, however, affect the principle of the invention to structure each waveguide such that it is transparent to one defined mode only.

The switching time of the thermo-optical polymer DOS in both switching configurations is <1 ms.

The defined transfer characteristic in the same switch was also established at $\gamma=1.3$ $\mu$m and displays a similar digital switching action (not shown).

Figure 7:
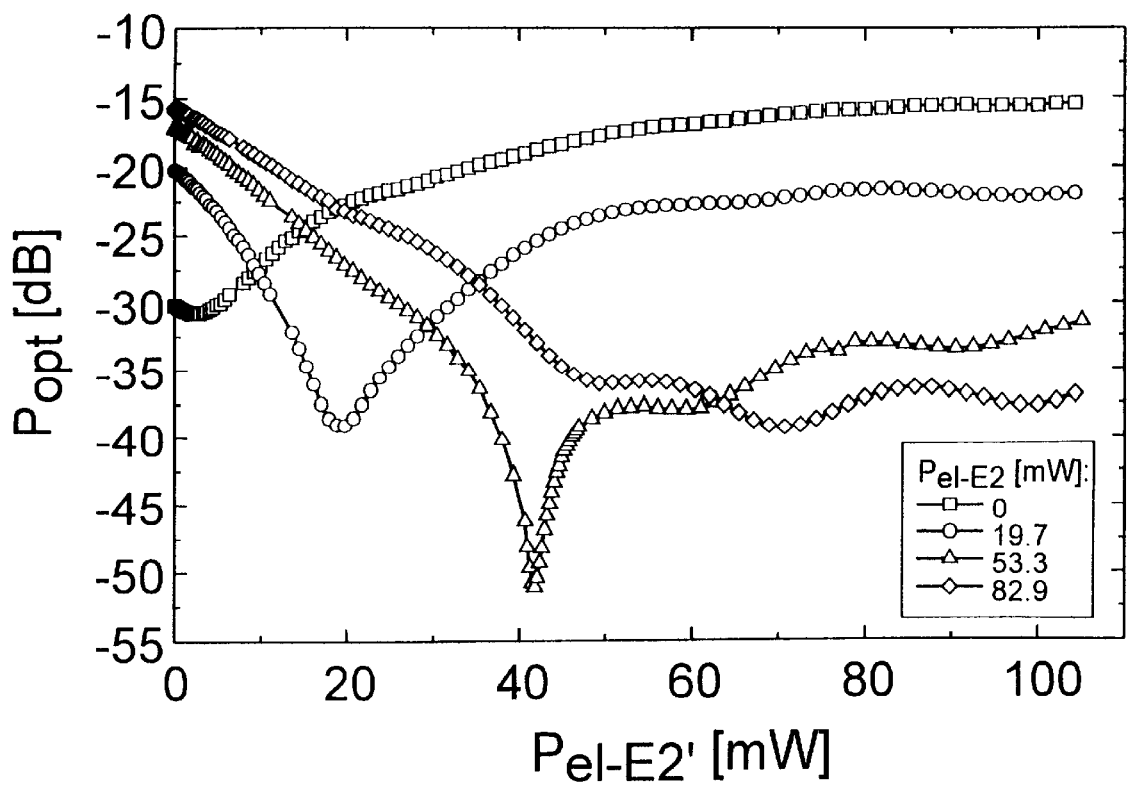
FIG. 7 is a measurement trace depicting the adjustability of the switching mode.

Looking at FIG. 7 which depicts the transfer characteristics of the polymer DOS in accordance with the invention with the same electrode configuration as shown in FIG. 5 but at different values for $P_{el-E2}$, it will be seen that the switching action of such a DOS may be adjusted by energizing an electrode in the input section at a variable switching power and by a constant basic energization of an electrode in the input section. It can be seen that the "digitality" of the DOS may be adjusted as a function of the constant value $P_{el-E2}$ for the basic energization of electrode E2 in input section S1, such that within a narrow range of $P_{el-E2'}$ values a very good extinction ratio is ensured. If this value is changed a "robust" digital switching action at a low extinction ratio will present itself.

The described switching action permits tolerances in the technological fabrication process and eliminates the need for a precise current or voltage control. Furthermore, the switching action of the presented DOS is stable against changes in ambient temperature.

What is claimed is:

1. A digital optical switch, comprising:
   an input section including
   first and second input waveguides providing for substantially symmetrical mode propagation and converging in the input section in a point in their coupling region;
   an output section including
   third and fourth output waveguides in the output section providing substantially symmetrical mode propagation and respectively connected to the first and second input waveguides and diverging from the point;
   a selectively energizable structured electrode overlapping to each of the first and second input waveguides and the third and fourth output waveguides in a tapering manner thereby to affect an adiabatic mode evolution in the waveguide.

2. The switch of claim 1, wherein the input waveguides and the output waveguides are of identical in cross-section.

3. The switch of claim 1, wherein the input waveguides and the output waveguides are of identical refractive index.

4. The switch of claim 1, wherein the waveguides are symmetrical in their arrangement relative to light propagating therein.

5. The switch of claim 1, wherein the first and second input waveguides converge toward each other along straight lines at an angle of $\Theta<<\Delta\beta/\gamma$ between them wherein $\Delta\beta$ is the average difference of the propagation constants of the two symmetrical modes and $\gamma$ is the transverse wave constant in the vicinity of the waveguide and wherein the third and fourth output waveguides divert from each other along straight lines at the same angle $\Theta$ between them.

6. The switch of claim 1, wherein the first and second input waveguides converge toward each other in arcuate paths and wherein the third and fourth output waveguides divert from each other in arcuate paths.

7. The switch of claim 1, wherein the first and second input waveguides converge toward each other along straight lines at an angle of $\Theta<<\Delta\beta/\gamma$ between them wherein $\gamma\beta$ is the average difference of the propagation constants of the two symmetrical modes and $\gamma$ is the transverse wave constant in the vicinity of the waveguide and wherein the third and fourth output waveguides divert from each other along arcuate paths.

8. The switch of claim 1, wherein the first and second input waveguides converge toward each other in arcuate paths and wherein the third and fourth output waveguides divert from each other along straight lines at an angle of $\Theta<<\Delta\beta/\gamma$ between them wherein $\Delta\beta$ is the average difference of the propagation constants of the two symmetrical modes and $\gamma$ is the transverse wave constant in the vicinity of the waveguide.

9. The switch of claim 1, wherein the electrodes cover the waveguides in a tapering manner.

10. The switch of claim 1, wherein the electrodes are of tapered configuration and are disposed in the same layer as the electrodes.

11. The switch of claim 1, wherein at least one of the input section and the output section comprises a plurality of layers in superposition and wherein the waveguides and the electrodes are disposed in different layers.

12. The switch of claim 1, wherein the waveguides are made from a material selected from the group consisting of III-V semiconductors, $LiNbO_3$, glass, Si-GE-hybrid crystals, $Si_2$, and polymer.

13. The switch of claim 5, wherein the switch is made of a polymer and the angle $\Theta \leq 0.1°$.

14. The switch of claim 3, wherein the waveguides are disposed in a first layer of the input and output sections and the electrodes are superposed on the waveguides in a tapering configuration in a buffer layer.

15. The switch of claim 3 wherein selective energization of the electrode causes a change of $\Delta n>0.0015$ in the refractive index of the adjacent waveguide.

* * * * *